United States Patent
Knopf et al.

(10) Patent No.: US 9,004,612 B2
(45) Date of Patent: Apr. 14, 2015

(54) CONNECTION OF A FLANGED RING OF A HUB BEARING UNIT TO A MOTOR VEHICLE WHEEL OR SUSPENSION STANDARD OF A MOTOR VEHICLE

(75) Inventors: Andreas Knopf, Würzburg (GE); Paolo Re, Nichelino (IT)

(73) Assignee: Aktiebolaget SKF, Gothenburg (SE)

( * ) Notice: Subject to any disclaimer, the term of this patent is extended or adjusted under 35 U.S.C. 154(b) by 547 days.

(21) Appl. No.: 13/324,320

(22) Filed: Dec. 13, 2011

(65) Prior Publication Data

US 2012/0161502 A1    Jun. 28, 2012

(51) Int. Cl.
| | |
|---|---|
| *B60B 25/00* | (2006.01) |
| *F16C 33/64* | (2006.01) |
| *B60B 27/00* | (2006.01) |
| *F16C 33/60* | (2006.01) |

(52) U.S. Cl.
CPC .............. *F16C 33/64* (2013.01); *B60B 27/0005* (2013.01); *B60B 27/001* (2013.01); *F16C 33/60* (2013.01); *F16C 2326/02* (2013.01)

(58) Field of Classification Search
USPC ............... 301/35.627–35.629, 105.1, 111.01, 301/111.03, 111.04
See application file for complete search history.

(56) References Cited

U.S. PATENT DOCUMENTS

| | | | | |
|---|---|---|---|---|
| 1,602,560 | A | * | 10/1926 | Wahlberg ...................... 301/6.1 |
| 3,724,907 | A | * | 4/1973 | Housel ...................... 301/105.1 |
| 5,785,391 | A | * | 7/1998 | Parry et al. ............... 301/111.04 |
| 5,947,613 | A | * | 9/1999 | Cormier ....................... 384/538 |
| 6,626,502 | B1 | * | 9/2003 | Petrak ...................... 301/35.631 |
| RE38,779 | E | * | 8/2005 | Lovitt, Jr. ................. 301/35.629 |
| 7,134,732 | B1 | * | 11/2006 | Spokane et al. ............. 301/106 |
| 7,419,226 | B2 | * | 9/2008 | Jenkinson et al. ........ 301/35.629 |
| 8,117,752 | B2 | * | 2/2012 | Breitenbach et al. ...... 29/898.07 |

FOREIGN PATENT DOCUMENTS

| | | |
|---|---|---|
| GB | 2390991 A | 1/2004 |
| WO | WO2005030499 A1 | 4/2005 |
| WO | WO2005051604 A1 | 6/2005 |

* cited by examiner

*Primary Examiner* — Jason Bellinger
(74) *Attorney, Agent, or Firm* — Bryan Peckjian; SKF USA Inc. Patent Dept

(57) ABSTRACT

A connecting element serves to connect a flanged ring of a hub-bearing unit to a wheel or a suspension standard of a motor vehicle. The connecting element has an overall crown-like shape and forms, in a single piece, an annular portion and a plurality of parallel, equally angularly spaced pin portions which extend protruding axially from a same side of the annular portion and each have a threaded section.

11 Claims, 4 Drawing Sheets

CONNECTION OF A FLANGED RING OF A HUB BEARING UNIT TO A MOTOR VEHICLE WHEEL OR SUSPENSION STANDARD OF A MOTOR VEHICLE

CROSS-REFERENCE TO RELATED APPLICATION

This United States Non-Provisional Utility application claims the benefit of co-pending Italy Patent Application Serial No. TO2010A001063, filed on 27 Dec. 2010, which is incorporated herein in its entirety.

FIELD OF THE INVENTION

The present invention relates to a connecting element for connecting a flanged ring of a hub-bearing unit to a wheel or a suspension standard of a motor vehicle. The invention further relates to a hub bearing assembly comprising the said connecting element.

SUMMARY OF THE INVENTION

In order to mount a wheel on the hub of a motor vehicle, bolted connections are conventionally used. In the procedures most commonly used at the present time, threaded bores are conventionally provided in the flange of the hub and through bores are formed in the wheel for the purpose of fixing the wheel to the radial flange of the hub. The wheel, a flange of the brake rotor and the radial flange of the hub are placed axially adjacently to each other, and a set of corresponding bolts is inserted into the aligned bores of these three elements, the bolts being screwed tightly into the threaded bores of the hub.

According to another conventional arrangement, threaded nuts are used. The wheel, the flange of the brake rotor and the radial flange of the hub are placed axially adjacently to each other, and the bores in these components are aligned. Four or five screws are inserted from the axially inner (or "inboard") side of the flange of the hub. Each screw has a head and a shank having a terminal threaded portion and an axially knurled portion near the head. The screws are force-fitted with radial interference into the circular axial bores formed in the radial flange of the hub. When the screws have been fitted, the rotor and then the wheel are fitted onto the terminal parts of the shanks of the screws from the outside, and finally outer nuts are screwed on with a specified tightening torque. The knurling serves to fix the screws to the flange of the hub with respect to rotation, enabling the specified tightening torque to be applied correctly.

In the motor vehicle industry there is an increasing demand for the reduction of the weight of vehicle components, with the aim of reducing fuel consumption and exhaust emissions. In order to reduce the overall weight of the wheel, and particularly of the rotating mass, the flange of the hub can be partially made of a material which is lighter than the steel forming the central part or tubular core of the hub. Typically, the flange can be made of light metal alloys (such as aluminium, titanium or magnesium alloys), metal matrix composites, polymers, or fibre-reinforced polymers. The core of the hub is made of a high toughness metallic material such as bearing steel or low-carbon steel. The connection between the core of the hub and the lighter flange can be provided, alternatively, by means of a positive connection, or by overmoulding, for example by a semi-solid casting process.

It is known that the aforesaid light materials generally have lower mechanical strength than the steel, which is conventionally used.

The heads of the screws exert axial stresses directly on the areas surrounding the bores on the inboard face of the hub flange. This causes a concentration of high stresses on small surface areas. If axial knurling is provided on the screws, the connection of the screws to the hub flange is found to be insufficiently strong if the material of the flange is less hard than steel, or if the material of the flange has a higher coefficient of thermal expansion than the fastening screw. In these circumstances, the rotation of the screws with respect to the flange in which they are accommodated can be avoided by providing mutual non-circular form engagement between the screws and the bores of the flange. However, this requires special machining operations on the flange and screws in order to create a specific shape, which increases production costs.

To compensate for the lower mechanical strength of light materials, these materials are used in combination with tubular steel inserts, which are incorporated in the flange or fixed to it in some other way. These inserts, distributed at angular intervals in the flange, are used to create the threaded surfaces of the bores into which the screws are subsequently screwed, the threaded shanks of the screws protruding at least partially from the outboard side of the flange, that is to say the surface facing towards the axially outer (or "outboard") side. Alternatively, the tubular inserts can be retained axially and rotationally by means of an outer thread, or a forced radial coupling, using one or more axial ribs or grooves on the outer cylindrical surface of each insert. Axial retention is also provided by a shoulder formed at the axially inner end of the insert, which is adapted to bear against the axially inner face of the hub flange.

The tubular inserts can be assembled onto the flange after the forming of the latter, or can be placed in the mould before the moulding operation, which forms the hub flange. In the latter case, the flow of plastic material in the moulding cavity is not sufficient to ensure the good structural quality of the portions of the flange located around the insert. In particular, an imperfect flow of plastic material causes incomplete filling of the areas downstream of the inserts, with respect to the direction of the flow of material in the mould.

If the inserts are positioned after casting, externally threaded inserts are normally used. This usually requires the forming of a pre-threaded bore in the flange, or the use of externally self-tapping inserts that are locked in the flange during insertion. Self-tapping inserts and the operations for their insertion require considerable expenditure. The axial retention is developed locally at the insert/flange interface, and gives rise to concentrated high stresses. This also occurs in the case of force-fitted inserts which each have one or more axial ribs on their outer cylindrical surfaces, for the purpose of preventing rotation of the insert with respect to the flange.

Similar arrangements to those discussed above are used to connect the outer flanged ring of a hub-bearing unit to the suspension standard of a motor vehicle.

A general object of the invention is to improve the mounting and locking of a hub bearing unit having a flange of light material onto a wheel or onto a suspension standard. More specifically, an object is to provide a stable and precise threaded connection, to simplify the positioning of the threaded elements for fastening to the wheel or to the standard, and to optimize the distribution of stresses in the flange. Another object is to prevent the rotation of the threaded fixing elements with respect to the flange in the course of tightening and unscrewing.

These and other objects and advantages, which will be understood more fully below, are achieved according to the present invention by a connecting element.

BRIEF DESCRIPTION OF THE DRAWINGS

A few preferred but non-limiting embodiments of the invention will now be described, reference being made to the attached drawings, in which.

DETAILED DESCRIPTION OF THE INVENTION

Figure 1:
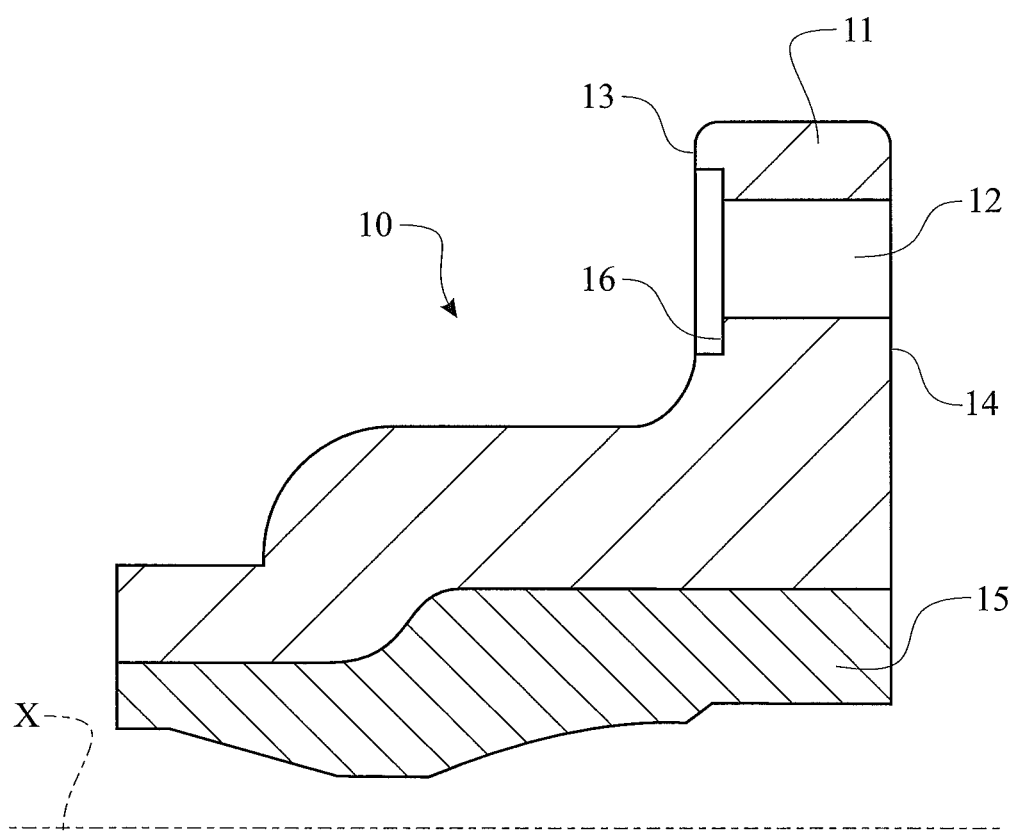
FIG. 1 is a partial view, in axial section, of a flanged ring forming part of a hub bearing assembly according to an embodiment of the invention.

Referring initially to FIG. 1, number 10 designates a flanged ring forming part of a hub-bearing unit (not shown). The ring 10 defines a central axis of rotation X and is designed to be used either as the rotatable ring which is connected to the vehicle wheel, or as the stationary ring which is connected to the suspension standard. For this connection, the ring 10 is provided with a flange 11, which extends in a radially outward direction and has four or five parallel axial through bores 12 formed in it at angularly equally spaced locations around the axis X.

Throughout the present description and the claims, any terms and expressions indicating positions and directions, such as "radial" and "axial", are to be understood as referring to the axis of rotation X of the hub-bearing unit. On the other hand, expressions such as "axially inner" (or "inboard") and "axially outer" (or "outboard") refer to the mounted condition on the vehicle. In the following description, reference is made to an exemplary application in which the ring 10 is the radially outer rotatable ring of a hub-bearing unit, and the flange 11 is fixed to the wheel. Those skilled in the art will understand that the expressions "axially inner" and "axially outer" must be interchanged with each other in different applications (for example, if the ring 10 is fixed to the standard).

The bores 12 extend through the flange 11 between an axially inner radial face 13, which faces the vehicle when in use, and an axially outer radial face 14, forming a flat support surface for a brake rotor (not shown) and/or for the wheel to be connected to the hub 10, or for the suspension standard (not shown).

The flange 11 is made, at least partially, of a material defined herein as "light", which is preferably selected among the following: light metal alloys (such as aluminium, titanium or magnesium alloys), metal matrix composites, polymers, and fibre reinforced polymers.

The flange 11 is connected integrally and rigidly to a central portion 15 of the hub in the form of a substantially tubular core, illustrated only in part, which is made of a high toughness metallic material such as steel, preferably bearing steel or low-carbon steel. The methods of connecting the steel core or central portion 15 to the light flange 11 are known in the art and are therefore not discussed here. Suffice it here to mention that the flange 11 of light material is connected to the core 15 preferably by overmoulding or casting, or by a positive connection with radial interference.

Figure 2:
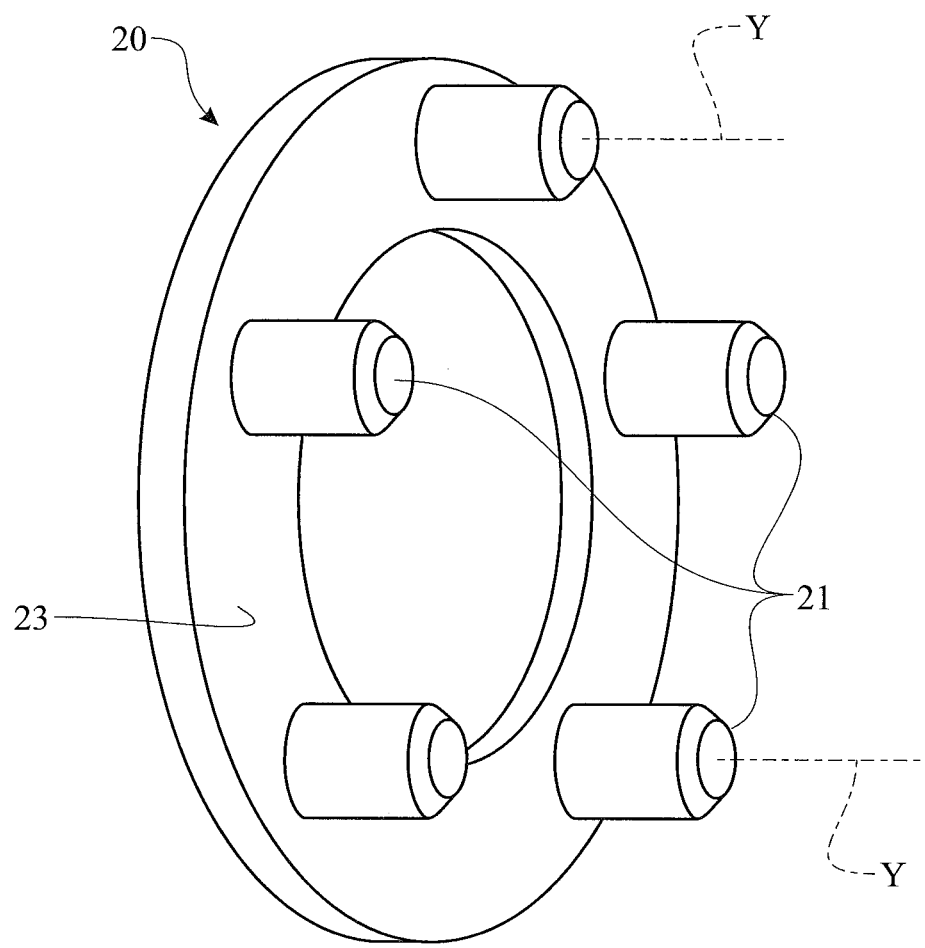
FIG. 2 is a schematic perspective view of a first embodiment of a pin connection element to be associated with the flanged ring of FIG. 1.
Figure 3:
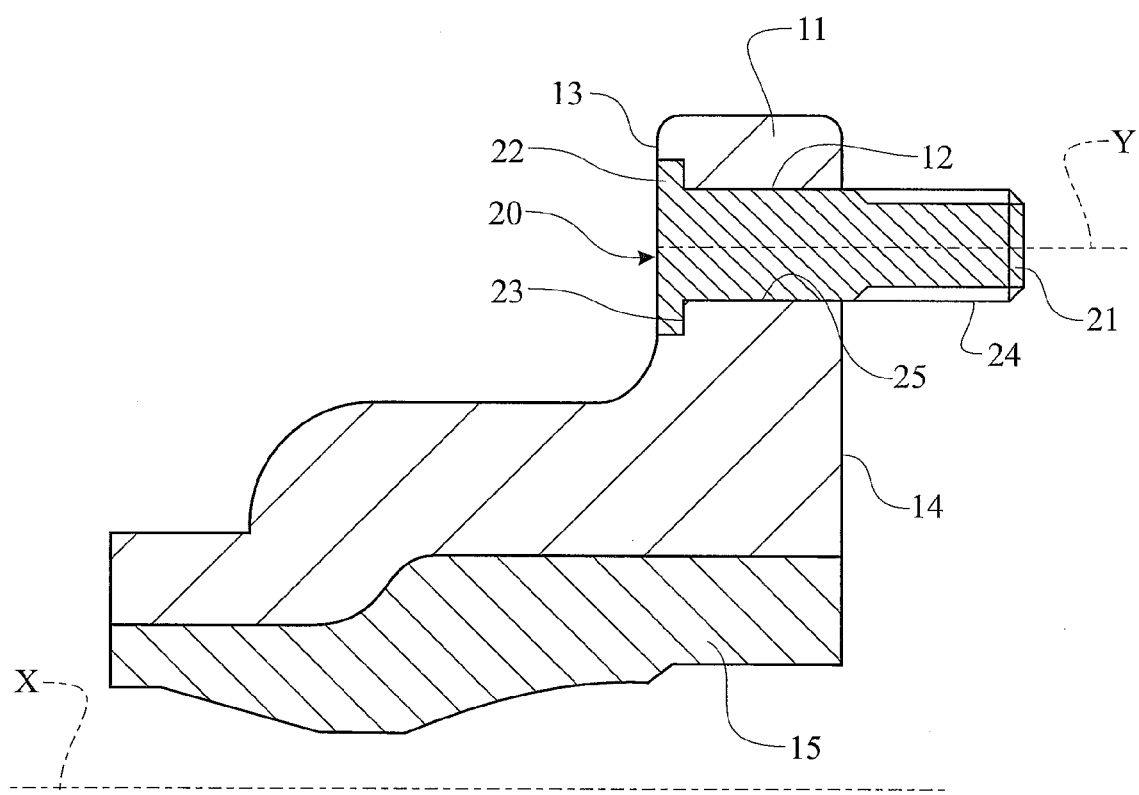
FIG. 3 is a partial axial cross-sectional view of an embodiment of an assembly which includes the flanged ring of FIG. 1 and the connection element of FIG. 2.

The through bores 12 are intended to partially accommodate a corresponding plurality of pin portions 21, which serve to fasten the wheel. The pin portions are formed by a single connecting element 20, shown separately in FIG. 2, which is coupled to the flange 11 as shown in FIG. 3. The connecting element 20 has an overall crown-like shape, with the parallel pin portions 21 which are five in number in the illustrated embodiment and which are formed as a single piece with an annular portion 22. The connecting element 20 is made of ferrous material, preferably cold-pressed iron or steel. The pin portions 21 extend protruding axially from a flat radial face 23 of the annular portion 22. In use, the radial face 23 is axially abutting against the axially inwardly facing radial face 13 of the hub flange 11. The pin portions 21 each provide a threaded section 24 axially protruding beyond the axially outer face 14 of the hub. A threaded nut (not shown) is screwed on the threaded section 24 in order to fasten the wheel to the hub. Indicated Y is the longitudinal axis of one of the pin portions 21. The Y-axis coincides with the central axis of the bores 12 and is parallel to the central axis of rotation X.

In an embodiment, if for example the thickness of the flange has to be limited for reasons of bulk, the annular portion 22 of the connecting element 20 is accommodated in an annular recess 16 of the flange 11. The recess 16, which in the particular embodiment has a ring-like shape, is formed on the axially inwardly facing face 13 of the hub flange and embraces the zones where the through bores 12 open on the face 13. The shape of the recess 16 corresponds to the shape of the annular portion. The latter may be regarded as a single head portion, which secures the pin portions 21 with one another. The above arrangement prevents the pin portions 21 from rotating inside the relevant bores 12.

In an embodiment, the pin portions 21 have an intermediate non-threaded length 25 (FIG. 3) between the threaded end portion 24 and the annular portion 22. The connection element 20 can be fixed to the hub flange 11 with radial interference between the preferably smooth outer cylindrical surfaces 25, of the pin portions 21, and the cylindrical bores 12 of the flange.

In other embodiments (not shown), the annular portion 22 and the recess 16 can have contours different from a circular contour concentric to the axis X. For example, the annular portion 22 and the recess 16 can have corresponding contours, for example undulated, in order to increase the anti-rotation effect. If the hub flange 11 is made by casting, various shapes of non-circular and non-concentric shapes can be obtained. Nevertheless, a circular concentric shape of the contours is simple and advantageous from a constructional point of view, in case it is manufactured by machining.

Figure 4:
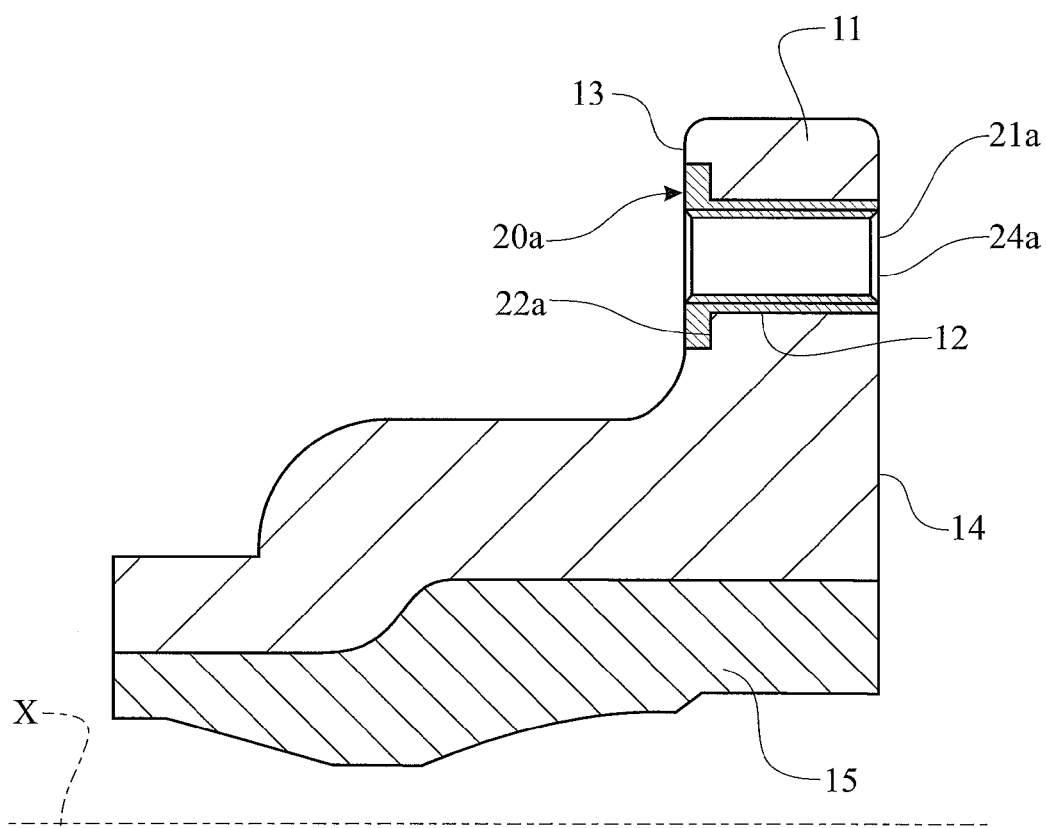
FIG. 4 is a partial axial cross-sectional view of an alternative embodiment of a hub bearing assembly according to the invention, comprised of the flanged ring of FIG. 1 and a connection element different from that shown in FIGS. 2 and 3.

According to the alternative embodiment shown in FIG. 4, the annular portion 22a may abut the inwardly facing radial face 13. The connection element 20a has hollow pin portions 21a, each having an axial through threaded bore 24a adapted for accommodating a conventional bolt (not shown) for fastening the wheel. The pin portion 21a should not project axially beyond the outboard face 14 of the flange. This face should provide an accurate resting surface, perfectly perpendicular to the axis of rotation X, for the wheel and the brake rotor.

It will be appreciated that the bolted connection is quicker due to a single crown-like connecting element being fitted onto the flanged ring. The annular portion 22 determines an accurate and parallel orientation for all the threaded pin portions. This is due to the fact that the connecting element 20 is a single piece, and due to the possibility of exploiting a broad resting surface on the inboard side of the hub flange. Furthermore, the overall crown-like structure and the annular portion 22 allow the loads to be distributed over a generally greater contact surface. In any case, the contact pressures transmitted from the wheel or brake rotor to the flanged ring or from the flanged ring to the suspension are rendered more uniform. Therefore, rotation of the pin portions is prevented without generating high peaks of concentrate stress in the flange 11, which would otherwise be particularly harmful to the light material, which the flange is made of.

While certain exemplary embodiments have been disclosed in the foregoing detailed description, it should be appreciated that a vast number of variations exist. It should also be appreciated that the exemplary embodiment or exemplary embodiments are only illustrative examples, and are not intended to limit the scope, applicability, or configuration in any way. Rather, the foregoing description and the drawings will provide those skilled in the art with a convenient road map for implementing the invention, it being understood that various changes may be made in the function and arrangement of elements described in the exemplary embodiments without departing from the scope as set forth in the appended claims and their legal equivalents.

We claim:

1. A hub bearing assembly for a motor vehicle wheel, the assembly comprising:
    a tubular core having a longitudinal axis,
    a flange extending in a radially outer direction from the core, wherein the flange includes first and second opposing radial faces, and wherein the flange provides a plurality of axial through bores extending from the first radial face to the second radial face at angularly equally spaced positions around the longitudinal axis, and
    a connecting element comprising:
        an annular shaped ring having a generally planar body with an exterior circumference and an interior circumference, and
        a plurality of parallel, equally angularly spaced pin portions that extend axially from a same side of the annular shaped ring, each pin portion defining an axial bore at least partially therethrough, wherein an inner surface defining the axial bore comprises a threaded section, and wherein the pin portions do not project axially beyond the second radial face of the flange when the annular shaped ring abuts the first radial face of the flange.

2. The hub bearing assembly as recited in claim 1, wherein the annular shaped ring is made of ferrous material.

3. The hub bearing assembly as recited in claim 2, wherein the annular shaped ring is made of cold-pressed iron or steel.

4. The hub bearing assembly as recited in claim 1, wherein the pin portions extend axially from a flat radial face of the annular shaped ring.

5. A hub bearing assembly for a motor vehicle wheel, the assembly comprising:
    a flanged ring defining a central axis of rotation, the flanged ring comprising:
        a tubular core made of a first material,
        a flange extending in a radially outer direction from the core, wherein the flange includes first and second opposing radial faces, wherein the flange is made of a second material lighter than the first material, and wherein the flange provides a plurality of axial through bores at angularly equally spaced positions around the axis; and
    a connecting element comprising:
        an annular shaped ring having a generally planar body with an exterior circumference and an interior circumference, and
        a plurality of parallel, equally angularly spaced pin portions that extend protruding axially from a same side of the annular shaped ring, each pin portion defining an axial bore at least partially therethrough, wherein an inner surface defining the axial bore comprises a threaded section, and wherein the pin portions do not project axially beyond the second radial face of the flange when the annular shaped ring abuts the first radial face of the flange,
    wherein the pin portions are at least partially inserted within the through bores, whereby the threaded sections enable connection of the flanged ring to one of a wheel or a suspension standard of a motor vehicle.

6. The hub bearing assembly as recited in claim 5, wherein the annular portion is seated at least partially in an annular recess of the flange.

7. The hub bearing assembly as recited in claim 5, wherein the first material is bearing steel or low-carbon steel, and
    the second material is selected from the group consisting of: aluminium alloys, titanium alloys, magnesium alloys, metal matrix composites, polymers, and fiber reinforced polymers.

8. The hub bearing assembly as recited in claim 1, wherein outer surfaces of the pin portions form interference fits with inner surfaces of the flange that define the through bores.

9. The hub bearing assembly as recited in claim 8, wherein the outer surfaces of the pin portions that form the interference fits are not threaded.

10. The hub bearing assembly as recited in claim 1, further comprising a bolt that engages the threaded section to secure the connecting element to the motor vehicle wheel.

11. The hub bearing assembly as recited in claim 1, wherein the side of the annular shaped ring having the pin portions extending therefrom also comprises contours configured to engage corresponding contours in the first radial face of the flange to prevent relative rotation therebetween.

\* \* \* \* \*